United States Patent

Homma

[15] 3,684,839

[45] Aug. 15, 1972

[54] MAGNETIC TRANSDUCER HEAD WITH SEPARABLE POLE TIPS

[72] Inventor: Ko Homma, Tokyo, Japan

[73] Assignee: Akai Electric Co., Ltd., Tokyo, Japan

[22] Filed: Oct. 20, 1970

[21] Appl. No.: 84,959

[30] Foreign Application Priority Data

Oct. 31, 1969 Japan ....................44/87314
Dec. 5, 1969 Japan ....................44/115652
Dec. 5, 1969 Japan ....................44/115653

[52] U.S. Cl.......................179/100.2 C, 340/174.1 F

[51] Int. Cl...............................................G11b 5/28

[58] Field of Search..........179/100.2 C; 340/174.1 F; 346/74 MC

[56] References Cited

UNITED STATES PATENTS 2,861,135 11/1958 Rettinger...........179/100.2 C 2,915,812 12/1959 Rettinger...........179/100.2 C

*Primary Examiner*—J. Russell Goudeau

*Attorney*—Oblon, Fisher & Spivak

[57] ABSTRACT

A magnetic head has a front head portion which is adapted to engage with a rear head portion. The front head portion has a front holder which includes a plurality of core tips and a plurality of front shield plate sections in spaced relationship to each other. The rear head portion has a rear holder which includes a plurality of U-shaped core portions and a plurality of rear shield plate sections in spaced relationship to each other. The number of U-shaped core portions provided is equal to the number of core tips. The rear holder is further provided with a plurality of pairs of holes, the same being widened at a frontward portion thereof, for fixedly retaining the U-shaped core portions and the rear shield plate sections therein. Each of the pairs of holes are interconnected by a slot which is also provided within the rear holder.

4 Claims, 6 Drawing Figures

PATENTED AUG 15 1972 3,684,839

INVENTOR
KO HOMMA
BY
Oblon, Fisher & Spivak

MAGNETIC TRANSDUCER HEAD WITH SEPARABLE POLE TIPS

BACKGROUND OF THE INVENTION

1. Field of the Invention

This invention generally relates to a magnetic head for use in a tape recorder, and more particularly to a magnetic head having a front head portion which includes a plurality of core tips each having a gap therein, a rear head portion which includes a plurality of U-shaped core portions, and engaging means for arranging the front head portion to abut the rear portion whereby a plurality of substantially closed magnetic paths is formed.

2. Description of the Prior Art

In the past, ring cores used in magnetic heads have been formed out of two U-shaped core sections which were divided in the direction of the legs of the cores. Each core section had a coil winding mounted thereon. The two separate core sections were bonded to each other by a suitable method of glass bonding and a gap was defined therebetween. While somewhat satisfactory, one of the problems with the prior art ring cores so formed was that in the process of glass bonding, often the insulation for a coil winding would be burnt by heat from the bonding temperature and thereby deteriorate.

On the other hand, it was also difficult from a manufacturing point of view to wind a coil around a core which has already been formed as a ring.

In order to remove the drawbacks present in the above described prior art, there has been proposed a magnetic head including ring cores each of which was formed out of two core sections divided in a direction perpendicular to the legs thereof, the two core sections being a core tip and a U-shaped core portion.

While generally satisfactory, it has been found that with such a magnetic head it is somewhat difficult to accurately arrange each core tip to abut with a corresponding U-shaped core portion. More particularly, prior to abutment of each core tip with a corresponding U-shaped core portion, the core tips and U-shaped core portions are separately lapped. Such separate lapping procedure has been found to be very laborious and quite time consuming. In addition, it has been found to be extremely difficult to accurately abut the core tips with the corresponding U-shaped core portions due to an unevenness of the individual abutment faces of the core tips and U-shaped portions as a result of the separate lapping procedure.

In magnetic heads of the type described above, the core tips and the U-shaped core portions are fixedly retained in respective and separate holders. More specifically, the core tips are held within a front holder, and both legs of the U-shaped core portions are inserted into holes formed in a rear holder. The legs are retained at their abutment ends within the holes with the aid of an adhesive agent which is injected into the clearance between the interior surface of the holes and the legs. In the past, any surplus of the adhesive agent thus injected would overflow from the clearance and remain in the vicinity of the abutment faces of the U-shaped core portions. This would sometimes cause difficulties in lapping of the abutment faces and thus incomplete abutment of some or all of the core tips and the U-shaped core portions.

Moreover, it was found that in the past when the legs of the U-shaped core portions were held at their abutment ends in the holes of the rear holder, which was made of a non-magnetic, metallic material such as brass, a shortened loop of one turn was formed around the legs of the U-shaped core portions by the holder. This shortened loop would act to interrupt the flow of magnetic flux which represented the recording or reproducing signals present in the ring core of the magnetic head, when the latter was in operation. Thus, the magnetic reluctance of the ring core was increased and as a result thereof the characteristics of the electromagnetic conversion was distorted.

SUMMARY OF THE INVENTION

Accordingly, one object of this invention is to provide a new and improved unique magnetic head having ring cores therein.

Another object of this invention is to provide a new and improved magnetic head having a front holder which includes core tips each having a gap therein and a rear holder which includes a corresponding number of U-shaped core portions.

Still another object of this invention is to provide a new and improved magnetic head which has desirable magnetic characteristics.

A further object of this invention is to provide a new and improved unique magnetic head wherein the core sections are simultaneously and accurately lapped.

Yet another object of the present invention is to provide a new and improved magnetic head wherein abutment of the core tips with the U-shaped core portions thereof is easily and accurately effected.

One other object of the present invention is to provide a new and improved magnetic head which is simple to construct.

Briefly, in accordance with the present invention, these and other objects are, in one aspect, attained by the provision of a magnetic head having a plurality of ring cores each of which consists of two core sections divided in a direction perpendicular to the legs of the cores. One of the core sections includes core tips which are fixedly retained in a front holder together with shield plate sections for shielding the core tips from each other. The other of the core sections includes U-shaped core portions which are fixedly retained in a rear holder together with shield plate sections for shielding the U-shaped core portions from each other. Both the front and rear holders are arranged by engaging means so that the corresponding core sections and the corresponding shield plate sections will abut with each other.

With the structure as set forth above, it becomes possible to perform simultaneous lapping of the abutment faces of a plurality of the core sections and the shield plate sections retained in each holder. Such a simultaneous lapping procedure will enable the possibility of an inaccurate abutment due to unevenness of the lapped abutment faces to be avoided. Such an arrangement is also effective in simplification of assembly and reduction in time and labor in comparison with the prior art wherein the core sections and the shield plate sections were separately lapped.

Moreover, with the present invention, in another aspect, the holes provided within the rear holder and into which the core sections and the shield plate sections are fixedly held, are widened in the frontward portion of the holder to prevent any surplus adhesive agent from remaining in the proximity of the abutment faces which could disturb the lapping thereof, and cause imperfect abutment due to any surplus adhesive agent that otherwise might have remained on the abutment faces.

Furthermore, according to this invention, a pair of holes are provided for each U-shaped core portion and the same are connected to each other by a slot in order to prevent shortened loops from being formed around both legs of the core portions in the holders. With this structure, any drawbacks such as distortion of the characteristics of the electromagnetic conversion which could result from the shortened loop in the prior art is removed.

BRIEF DESCRIPTION OF THE DRAWINGS

A more complete appreciation of the invention will become readily apparent as the same becomes better understood by reference to the following detailed description when considered in connection with the accompanying drawings, wherein.

DETAILED DESCRIPTION OF THE PREFERRED EMBODIMENT

Figures 1, 2, 3, 4:
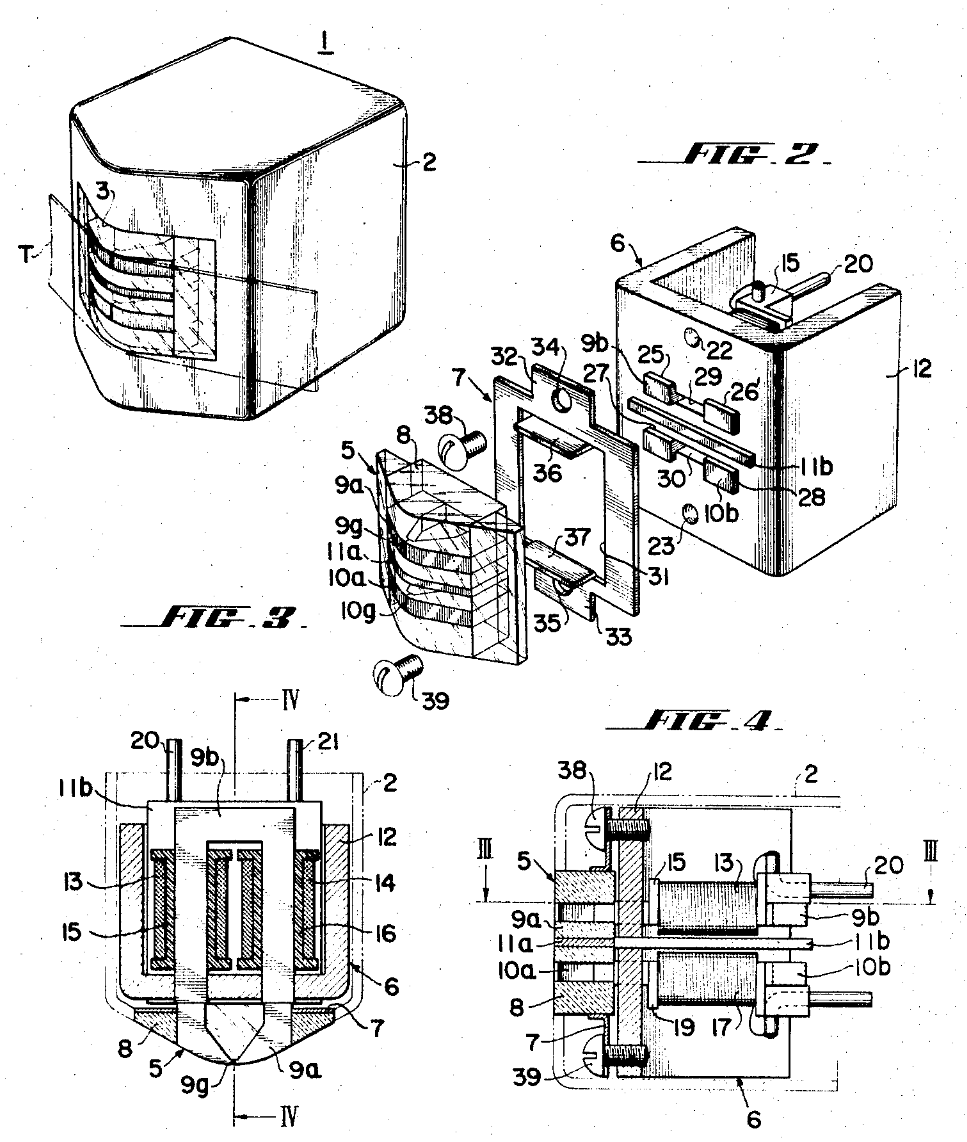
FIG. 1 is a perspective view of a completed magnetic head according to this invention.
FIG. 2 is an exploded perspective view of the magnetic head of FIG. 1 with its outer shield case removed.
FIG. 3 is a sectional plan view of the magnetic head taken along the line III—III of FIG. 4 with its outer shield case removed as indicated by a phantom line.
FIG. 4 is a sectional side view of the magnetic head taken along the line IV—IV of FIG. 3 with its outer shield case removed as indicated by a phantom line.

Referring now to the drawings, wherein like reference numerals designate identical or corresponding parts throughout the several views, and more particularly to FIG. 1 thereof, wherein a magnetic head 1 for effecting a recording and/or reproducing function in cooperation with a magnetic tape T according to the present invention is shown with the body of the magnetic head being exposed at a transparent or semi-transparent window 3 which is provided on a front face of an outer shield case housing 2.

The body of the magnetic head is shown in exploded form in FIG. 2 and includes a front head portion 5, a rear head portion 6, and a frame 7. The frame 7 is used for engaging the front head portion 5 with the rear head portion 6. The front head portion 5 comprises a front holder 8 which includes two core tips 9*a* and 10*a*, each of which has a respective gap 9*g* and 10*g* at the center portion thereof and a front shield plate section 11*a* for magnetically shielding the core tips 9*a* and 10*a* from each other. The rear head portion 6 is made of a non-magnetic material and comprises a U-shaped rear holder 12 which includes two U-shaped core portions 9*b* and 10*b* and a rear shield plate section 11*b* for magnetically shielding the U-shaped core portions 9*b* and 10*b* from each other. The manner in which the U-shaped core portions and the rear shield plate section are fixedly retained in the rear holder 12 will be explained hereinafter in connection with FIGS. 5 and 6. Since the mechanical support for the core portions will affect the magnetic characteristics thereof, it is preferable that the U-shaped core portions 9*b* and 10*b* and the rear shield plate section 11*b* be held on the rear holder 12 only at the abutment ends of both legs of the core portions. The arrangement of the U-shaped core portions 9*b* and 10*b* and the rear shield plate section 11*b* within the rear holder 12 can be seen best by reference to FIGS. 3 and 4.

From FIGS. 3 and 4, it is clearly seen that the U-shaped core portions 9*b* and 10*b* and the rear shield plate section 11*b* placed therebetween are held in parallel and spaced relationship to each other. It should be understood that prior to the abutment of the core tips 9*a* with the U-shaped core portion 9*b*, a pair of insulated bobbins 15 and 16 having coil windings 13 and 14 mounted thereon are respectively placed on the legs of the upper U-shaped core portion 9*b*. In a similar fashion, a pair of insulated bobbins having coil windings mounted thereon are placed on both legs of the lower U-shaped core portions 10*b*. In FIG. 4, one lower insulated bobbin 19 and the coil winding 17 placed thereon for the lower U-shaped core portion 9*a* is therein shown. The two coil windings 13 and 14, which are wound on the upper U-shaped core portions 9*b*, are electrically connected to each other at one of their ends and are electrically connected at their other ends to respective terminals 20 and 21. The coil windings placed on the lower U-shaped core section 10*b* are similarly connected at one end to each other and connected to respective terminals at the other ends thereof.

Prior to arranging the front holder 8 and the rear holder 12 for abutment with each other, the abutment faces of the core sections and the shield plate sections held within each holder are respectively and simultaneously lapped so that all of the abutment faces of each holder will be in the same plane. This is very advantageous in the subsequent alignment of the two holders for abutment with each other, since otherwise a gap would be present in certain ones of the aligned core and shield plate sections. Moreover, as the number of cores to be included in a magnetic head is increased, the merits resulting from the above described lapping will be even greater.

On the front face of the rear holder 12, near the upper and lower portions thereof, tapped holes 22 and 23 are provided for enabling the front head portion 5 to be fixedly engaged with the rear head portion 6. It should be understood that the front head portion 5 is aligned with the rear head portion 6 with the aid of the frame 7 in such a fashion as to form substantially closed magnetic paths.

In the embodiment shown in the drawings, the front holder 8 is shown by way of example as being made of transparent or translucent wear-resistant members such as glass. It should be further understood, however, that the front holder 8 is not limited to such material, but may be of any non-magnetic material. In addition, the front holder 8 is not limited to the configuration shown, but may be of any other desired shape, such as a unit structure.

Figure 5:
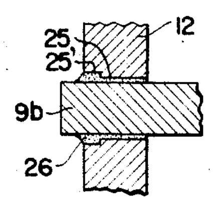
FIG. 5 is an enlarged partial sectional view illustrating the retaining structure for the core sections of the magnetic head according to this invention; and, FIG. 6 is a view similar to FIG. 5 illustrating the retaining structure for the core sections according to the prior art.
Figure 6:
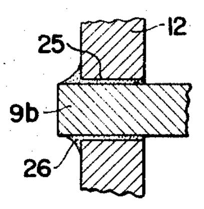

Referring now to FIGS. 5 and 6, the manner in which the core tips 9*b* and 10*b* and the rear shield plate section 11*b* are held in the rear holder 12 will be explained.

With particular reference to FIG. 6, it is seen that in the prior art, the rear holder 12 was provided with pairs of holes, such as the hole 25, on the front face thereof and that both of the legs of the U-shaped core portions, such as the core portion 9*b*, were inserted therein until the abutment ends of the legs projected a little from the front face of the holder. An adhesive agent 26 was then injected into the clearance provided between the interior face of the holes and the legs of the U-shaped core portions inserted therein. This prior art method of inserting the U-shaped core portions within the rear holder presented various problems as described hereinbefore.

On the other hand, in the present invention, the rear holder 12 is provided on the front face thereof with holes such as hole 25, each of which are widened at the frontward portion of the holder, such as indicated by 25' in FIG. 5. With the holes formed in this way, any surplus of the adhesive agent 26 which is injected into the clearance between the holes and the U-shaped core portion, such as the core portion 9*b*, will stay in the space provided by the widened part of the hole, and therefore will not overflow onto the abutment faces of both of the legs of the U-shaped core portion. In accordance therewith, no surplus adhesive agent will occur at the abutment faces during the lapping and abutment thereof. It should be noted that numerous methods can be employed for widening the holes so as to make the same larger at the frontward portion of the holder than the back thereof.

Referring now again to FIG. 2, holes 25, 26' and 27, 28 are shown as being provided for holding the U-shaped core portions 9*b* and 10*b* in the rear holder 12 in a manner similar to that described with reference to FIG. 5. The holes 25 and 26' are connected to each other through a slot 29, and the holes 27 and 28 are connected to each other through slot 30, each of which is provided within the rear holder 12. The provision of slots 29 and 30 will serve to enhance the elimination of any adverse effects upon the characteristics of the electromagnetic conversion that closed or shortened loops formed around the legs of the U-shaped core portions 9*b* or 10*b* of the rear holder 12 would cause.

The frame 7 for engaging the front head portion 5 with the rear head portion 6 according to the present invention may be a non-magnetic metal plate such, for example, as beryllium-copper, and is provided with a rectangular opening 31 at the center thereof for receiving the front head portion 5. The frame 7 includes projections 32 and 33, each of which extends outwardly from the opposite outer edges of the frame, and two stoppers 36 and 37, each of which are upstanding on opposite edges of the opening 31 and perpendicular to the plane of the frame. The projections 32 and 33 of the frame 7 are respectively provided with holes 34 and 35 through which screws 38 and 39 are passed to engage the front head portion 5 with the rear head portion 6.

In putting together the magnetic head according to the present invention, the front head portion 5 after being assembled is fixed to the frame 7 with the aid of an adhesive agent applied thereto. The screws 38 and 39, after being passed through the holes 34 and 35 provided on the projections 32 and 33, are then applied to respective tapped holes 22 and 23 provided on the rear holder 12 so that the front head portion 5 and the rear head portion 6 will abut one another. The stoppers 36 and 37 are effective in preventing the front head portion 5 from displacing either in an upward or a downward direction. In this manner, the core tips 9*a* and 10*a* and the front shield plate section 11*a*, which are fixedly retained within the front holder 8, will be arranged to firmly and respectively abut with the U-shaped core portions 9*b* and 10*b* and the rear shield plate section 11*b*, which are fixedly retained within the rear holder 12 such as to form two ring cores and a shield plate.

Because of possible shear between the front and the rear head portions in the course of assembly, the abutment faces of the U-shaped core portions 9*b* and 10*b* and the rear shield plate section 11*b* are made larger than those of the core tips 9*a* and 10*a* and the front shield plate section 11*a*.

The outer shield case housing 2, as shown in FIG. 2, covers the body of the magnetic head thus assembled and is joined thereto by means of an adhesive agent. This shield case housing 2 may be further joined to the magnetic head assembly by filling with a cement, such as of the epoxy resin type.

It should be apparent that while in the embodiment described above, the frame 7 is used to engage the front head portion 5 with the rear head portion 6 that the invention is not so limited and that other means, as desired, may be readily used for engagement of the two head portions.

Obviously, many modifications and variations of the present invention are possible in the light of the above teachings. It is therefore to be understood that within the scope of the teachings herein and the appended claims, the invention may be practiced otherwise than as specifically described.

What is claimed as new and desired to be secured by Letters Patent of the United States is:

1. A magnetic head comprising:

a front head portion which includes a plurality of core tips, each of which has a gap therein, at least one front shield plate section between every adjacent core tip for magnetically shielding the same from each other, and a front holder for fixedly holding said core tips and said at least one front shield plate section in spaced relationship to each other;

a rear head portion which includes a plurality of U-shaped core portions, at least one rear shield plate section between every adjacent U-shaped core portion for magnetically shielding the same from each other, and a rear holder for fixedly holding said U-shaped core portions and said at least one rear shield plate section in spaced relationship to each other, the number of said U-shaped core portions being equal to the number of said core tips and the number of said rear shield plate sections being equal to the number of said front shield plate sections;

engaging means for arranging said front head portion to abut with said rear head portion whereby a plurality of closed magnetic paths, each of which includes one of said plurality of gaps, is formed;

wherein each of said plurality of core tips and said at least one front shield plate section has an abutment face all lying in the same plane and which are fixedly held in said front holder for being capable of abutment with said U-shaped core portions and said at least one rear shield plate section, each of which has an abutment face lying in the same plane; and wherein the front face of said rear holder is provided with a plurality of slots and pairs of holes therein, said pairs of holes being for holding the front abutment ends of both of the legs of each of said U-shaped core portions and each of said slots connecting a given pair of holes and wherein said rear holder has a hole for holding the front abutment end of each of said at least one rear shield plate sections.

2. A magnetic head comprising:

a front head portion which includes a plurality of core tips, each of which has a gap therein, at least one front shield plate section between every adjacent core tip for magnetically shielding the same from each other, and a front holder for fixedly holding said core tips and said at least one front shield plate section in spaced relationship to each other;

a rear head portion which includes a plurality of U-shaped core portions, at least one rear shield plate section between every adjacent U-shaped core portion for magnetically shielding the same from each other, and a rear holder for fixedly holding said U-shaped core portions and said at least one rear shield plate section in spaced relationship to each other, the number of said U-shaped core portions being equal to the number of said core tips and the number of said rear shield plate sections being equal to the number of said front shield plate sections;

engaging means for arranging said front head portion to abut with said rear head portion whereby a plurality of closed magnetic paths, each of which includes one of said plurality of gaps, is formed;

wherein each of said plurality of core tips and said at least one front shield plate section has an abutment face all lying in the same plane and which are fixedly held in said front holder for being capable of abutment with said U-shaped core portions and said at least one rear shield plate section, each of which has an abutment face lying in the same plane; and wherein the front face of said rear holder is provided with a plurality of pairs of holes therein for holding the front abutment ends of both of the legs of said U-shaped core portions therein and with a hole for holding the front abutment end of each of said at least one rear shield plate sections and wherein said pairs of holes are widened at a portion of the rear holder.

3. A magnetic head as set forth in claim 2, wherein said pairs of holes are widened at the frontward portion of the rear holder.

4. A magnetic head as set forth in claim 2, wherein an adhesive is provided for retaining the said plurality of said U-shaped core portions within said pairs of holes and wherein any excess adhesive will fill within the widened front portion of said rear holder and thereby not interfere with lapping of the front abutment ends of said U-shaped core portions after insertion within said rear holder.

* * * * *